United States Patent [19]

Patel et al.

[11] Patent Number: 5,171,813

[45] Date of Patent: Dec. 15, 1992

[54] METHOD AND APPARATUS FOR PREVENTING YELLOWING OF BENZOYL PEROXIDE SOLUTIONS IN ACRYLIC ADHESIVES

[75] Inventors: Naresh D. Patel, Northridge; Mark W. Brown, Downey, both of Calif.

[73] Assignee: IPS Corporation, Gardena, Calif.

[21] Appl. No.: 763,278

[22] Filed: Sep. 20, 1991

[51] Int. Cl.$^5$ .............................................. C08F 120/10
[52] U.S. Cl. ..................................... 526/328; 526/227
[58] Field of Search ......................................... 526/328

Primary Examiner—Joseph L. Schofer
Assistant Examiner—Wu C. Cheng
Attorney, Agent, or Firm—Joseph A. Yanny

[57] ABSTRACT

A method and apparatus for storing and preparing a two component reactive acrylic adhesive in which a liquid acrylic resin is mixed with an organic peroxide in solution without causing yellowing. A sealed container is used to house the peroxide solution and an inert gas, preferably nitrogen. The container is made from a translucent or transparent material to permit viewing during the mixing operation and is covered with an opaque material during storage of the peroxide solution and gas.

10 Claims, 1 Drawing Sheet

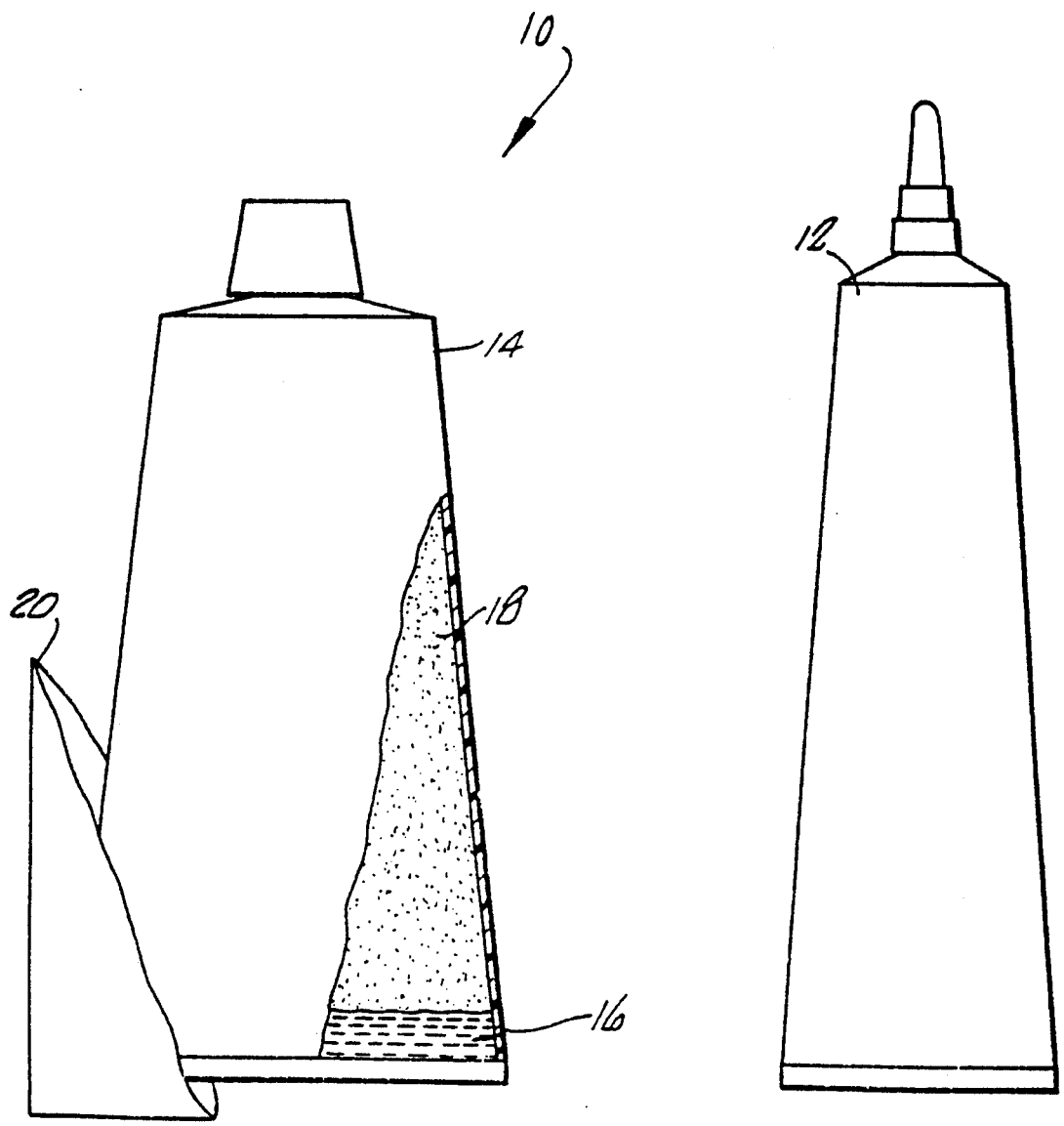
FIG_1 (a)   FIG_1 (b)

METHOD AND APPARATUS FOR PREVENTING YELLOWING OF BENZOYL PEROXIDE SOLUTIONS IN ACRYLIC ADHESIVES

BACKGROUND OF THE INVENTION

1. Field of the Invention

The invention relates to two component acrylic reactive adhesives used for joining plastic substrates or the like, and more specifically, relates to a method and apparatus for extending the stability and clear neutral color of organic peroxides by preventing the degrading and discoloring of such peroxides when used in two component acrylic reactive adhesives.

2. Description of the Prior Art

In the past acrylic bonding materials have been widely used to join filled acrylic sheets, polyester sheets and the like. Such materials are commonplace in private homes or industrial settings as countertops for kitchens and bathroom surfaces. Products utilizing two component acrylic adhesives for bonding sheet materials are produced under the trademarks CORIAN, SURELL, AVONITE, and FOUNTAINHEAD.

The aforementioned countertop materials are in high demand because of their functionality and aesthetic qualities. The aesthetic appeal is directly related to the success in the process of joining sheets or panels in such a way that the bonded area or seam is relatively inconspicuous. The seamless appearance of the countertops is highly desirable for both private homes and industrial sites. The appearance of a continuous, seamless surface requires a bonding adhesive that exactly matches the countertop material. Desirably the acrylic adhesives used to seam the solid plastic sheets together are prepared with pigmentation to exactly match the color of the sheets being seamed. However, it has been found that a problem exists with the organic peroxide solutions which initiate the reaction of the two component adhesives. The peroxide solutions turn yellow in color as a function of time and temperature. This yellow color in turn creates color matching problems between the seam and the plastic sheet surfaces resulting in conspicuous seams which are undesirable. With the advent of lighter and brighter surfaces being introduced due to consumer demands, these surfaces are even more sensitive to the yellowed initiators in the organic peroxide solutions.

Generally speaking, two component acrylic reactive adhesive is formed by mixing a first component including resins into a second component housing an initiator. The mixing process takes place within a few minutes. The mixed adhesive immediately begins to polymerize and eventually solidifies, in most instances, within one hour.

Normally the first component is formulated with an amine promoter which facilitates the timely polymerization of the adhesive. The promoter acts as an active source for the conversion of monomers to polymers. Preferably the second component is housed in a larger container than the first component so that the first can be added to the second. Usually the second component uses a reaction initiator in the form of organic peroxides in a solution. The reaction is initiated by the peroxides because they are highly unstable compounds which readily donate free radicals, or charged hydrogen and oxygen ions to the reaction mixture. Thus, the polymerization process when the organic peroxide is added to the polymer blend. These free radicals react with the monomers thus enhancing the reactivity of the monomers and speeding up the process of monomer linking to monomer to form long chains or polymers.

With all the advantages of these superior bonding adhesives, a basic problem still exists due to the uncontrollable degradation of the organic peroxides such that the solution turns from a clear organic liquid to a yellow liquid. The resulting yellow color makes it difficult if not impossible to match the color of bonding material to substrate.

The color change is due to the inherent instability of the free radical source in the organic peroxides and is a function of time and temperature. Thus, the change from clear to yellow increases over longer periods of time and/or higher temperatures. Also light may accelerate the degradation of the organic peroxide causing the color to shift from clear to yellow due to destabilization of the peroxide.

SUMMARY OF THE INVENTION

The novel method and apparatus provided by this invention overcomes the deficiencies to the prior art by insulating the organic peroxide in solution from air and light until the mixing of the adhesive being formed. The peroxide is sealed in a container which is filled with an inert gas. Any suitable gas can be used and preferably, nitrogen gas. Desirably, the container of peroxide solution and gas is covered with an opaque material to protect the contents from light. When it is desired to mix the two component materials into the reactive adhesive, the peroxide solution container is unsealed allowing the gas to escape and providing a chamber to receive the liquid resins from another container. Upon mixing polermerization takes place forming an adhesive which does not turn yellow due to premature degradation of the peroxide solution. Desirably the container for the peroxide solution is made from transparent or translucent material to enable viewing of the mixing of materials during the mixing operation.

DESCRIPTION OF THE DRAWING

Having thus described the invention in general terms, reference will now be made to the accompanying drawings in which:

FIG. 1 is an elevational view partly in section of packaging apparatus of the two component adhesive to show certain details thereof according to the present invention.

DETAILED DESCRIPTION OF THE INVENTION

Referring to FIG. 1 there is shown a packaging apparatus 10 to be used preparing the two component acrylic reactive adhesive according to the present invention. A first container 12 is filled with liquid resins which are polymerized during the mixture operation. Any suitable materials may be used as these materials are not a part of the instant invention. Typical materials are from about 15% to about 45% acrylic and/or methacrylic polymers, from about 25% to about 75% acrylic and/or methacrylic ester monomers, from about 0.1% to about 2.0% amine, from about 1% to about 5% pigmentation, and from about 5% to about 45% inert fillers.

In accordance with the present invention a second container 14 houses an organic peroxide 16 in solution. Above the peroxide solution 16 the container 14 is filled with nitrogen gas 18 which serves to insulate the peroxide solution and thus prevent its yellowing due to degradation from contact with oxygen. Any suitable organic peroxide solution can be used. Preferably a solution of benzoyl peroxide from about 1% to about 10% by weight in any suitable plasticizer, such as, dibutyl phthalate or dimethyl phthalate. Preferably container 14 is made from a transparent or translucent material so that viewing of the mixture can be had during the mixing operation Desirably container 14 is covered with an opaque material 20 which is removed just prior to the mixing operation. In this way the peroxide solution 16 is shielded from light while in a stored condition.

According to the invention opaque material is removed from container 14 and the container is unsealed allowing the nitrogen gas 18 to escape. The contents of container 12 is emptied into container 14 where proper mixing results in a desired adhesive formed without discoloration or yellowing. When proper mixing has resulted as observed through the transparent or translucent container 14, the completed adhesive is ready for dispensing from the container. It has been found that a proper mix ratio is about 10 to about 20 parts by weight of the materials from container 12 to about 1 part of container 14.

Various other modifications of the invention are contemplated which will be apparent to those skilled in the art and which can be resorted to without departing from the spirit and scope of the invention as defined by the following appended claims.

I CLAIM

1. An improved method of preparing a two component reactive acrylic adhesive comprising the steps of
forming a first component including an organic peroxide in solution in a sealed container filled with an inert gas;
forming a second component including liquid acrylic polymerizable resin;
breaking the sealed container allowing the gas to escape and filling the container with the second component and causing mixing thereof to produce an adhesive without yellowing in color.

2. A method according to claim 1 wherein said gas is nitrogen.

3. A method according to claim 1 wherein said container is made from a transparent material.

4. A method according to claim 1 wherein said container is made from a translucent material.

5. A method according to claim 1 wherein said container is covered with an opaque material until just prior to mixing.

6. Packaging apparatus for a two component reactive acrylic adhesive comprising
a first sealed container for housing a predetermined amount of an organic peroxide in solution and an inert gas; and
a second container for housing a predetermined amount of liquid polymerizable resin for mixing with said first container after braking the seal thereof.

7. Apparatus according to claim 6 wherein said inert gas is nitrogen.

8. Apparatus according to claim 6 wherein said first container is made from a transparent material.

9. Apparatus according to claim 6 wherein said first container is made from translucent material.

10. Apparatus according to claim 6 wherein said first container is covered with an opaque material during storage.

* * * * *